United States Patent

Brayshaw et al.

[11] 3,757,770
[45] Sept. 11, 1973

[54] PHYSIOLOGICAL PRESSURE SENSING AND TELEMETRY MEANS EMPLOYING A DIODE CONNECTED TRANSISTOR TRANSDUCER

[75] Inventors: Forrest G. Brayshaw; Theodore S. Roberts, both of Salt Lake City, Utah

[73] Assignee: Bio-Tel Western, Inc., Ogden, Utah

[22] Filed: Feb. 22, 1971

[21] Appl. No.: 117,589

[52] U.S. Cl. .......... 128/2 R, 128/2.05 D, 128/2.1 A
[51] Int. Cl. ..................................................... A61b 5/00
[58] Field of Search .................. 128/2.05 E, 2.05 R, 128/2.06 R, 2.1 A, 2.1 R, 2 R, 2 S

[56] References Cited
UNITED STATES PATENTS

| | | | |
|---|---|---|---|
| 3,453,546 | 7/1969 | Fryer | 128/2.1 A |
| 3,294,988 | 12/1966 | Packard | 128/2 R |
| 3,504,664 | 4/1970 | Haddad | 128/2.1 R |
| 3,534,728 | 10/1970 | Barrows | 128/2.06 R |

*Primary Examiner*—William E. Kamm
*Attorney*—Lynn G. Foster

[57] ABSTRACT

Pressure measurement apparatus and method, the apparatus having a pressure sensitive element, an audio oscillator, a transmitter, a receiver, a frequency-to-voltage converter and a read-out device. The pressure sensor is connected to and capable of varying the frequency of the audio oscillator as a function of the pressure applied to the sensor. The audio oscillator is connected to and capable of modulating the signal of the transmitter. The pressure sensor, audio oscillator and transmitter are implanted internal to the scalp of a living test subject, the pressure sensor being placed between the skull and the dura mater. Additionally, a remote receiver is connected to a frequency-to-voltage converter and is capable of receiving the radio frequency signal transmitter by the transmitter and supplying the detected audio oscillation of the radio frequency signal to the frequency-to-voltage converter. The frequency-to-voltage converter is capable of supplying a variable voltage to the read-out device, depending upon the frequency of the input signal delivered by the receiver. The read-out device is capable of optically displaying and/or recording the amount of signal voltage being fed to it by the frequency-to-voltage converter.

1 Claim, 5 Drawing Figures

PATENTED SEP 11 1973 3,757,770

INVENTORS.
THEODORE S. ROBERTS
FORREST G. BRAYSHAW
BY
*Lynn L. Foster*
ATTORNEY

PHYSIOLOGICAL PRESSURE SENSING AND TELEMETRY MEANS EMPLOYING A DIODE CONNECTED TRANSISTOR TRANSDUCER

BACKGROUND

1. Field of the Invention

The present invention relates to measurement of pressure and more particularly to novel apparatus and methods for electrically measuring internal physiological pressures.

2. The Prior Art

Prior art pressure measurements have been taken by spinal puncture and measurement of cerebrospinal fluid rising within a manometer tube.

With regard to the pressure measurement of the cerebrospinal fluid (CSF), meaningful attempts to measure and record CSF pressure were not conudcted until the 1950's; CSF pressure was monitored by connecting the subarachnoid space or the ventricular lumen to a simple water, mercury or spring manometer, but these methods were only actue approximations. The attempts to improve on this technique suffered from one or more of the following limitations:

1. Excessive spinal fluid was lost in the measuring process, causing considerable error and risk to the well being of the person or animal being tested;

2. Transducers and amplifiers (mechanical or optical) had excessive non-linearities and hysteresis;

3. Blockage of the system by choroid plexus, arachnoid membrane, nerve root or the brain itself occurred frequently, yet was often difficult to detect, particularly when the blockage was partial; and 4. Long-term measurements were frustrated by artifact movement, environmental changes and unstable instrumentation.

The first comprehensive review of CSF pressure techniques was presented in 1937 by Lagergran, who also described his own continuously-recording optical manometer, which failed to produce reliable data. In 1951 Guillaume and Janny made meaningful continuous human intraventricular pressure recordings, using a magnetic pressure transducer and optical recorder.

BRIEF DESCRIPTION AND OBJECTS OF THE INVENTION

The present invention, including apparatus and methods, provides a novel system for measuring the pressure of cerebrospinal fluid (CSF) with the use of small electronic components capable of being surgically or otherwise implanted within a living test subject. The pressure information is encoded into the output of an audio oscillator (carried by the test subject) by an implanted pressure sensing electronic component, the oscillator modulating a radio transmitter (also carried by the test subject). A remotely located receiving station receives and processes the modulated radio frequency signal to develop accurate pressure readings.

It is a primary object of the present invention to provide novel electronic pressure sensing structure for physiological use.

Another primary object of the present invention is to provide novel apparatus for accurate and continuous monitoring of CSF pressure.

Another important object of the present invention is to provide a novel system for the measurement of remote critically located physiological pressures.

These and other objects and features of the present invention will become more fully apparent from the following description and appended claims taken in conjunction with the accompanying drawings.

DETAILED DESCRIPTION OF THE ILLUSTRATED EMBODIMENT

General

Figure 1:
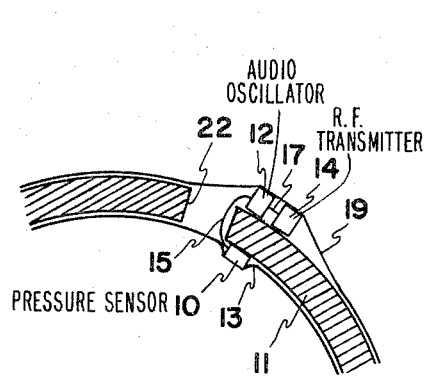
FIG. 1 is a cross sectional view of the transmitting portion of the present invention implanted at the head of a living test subject.
Figures 2, 3:
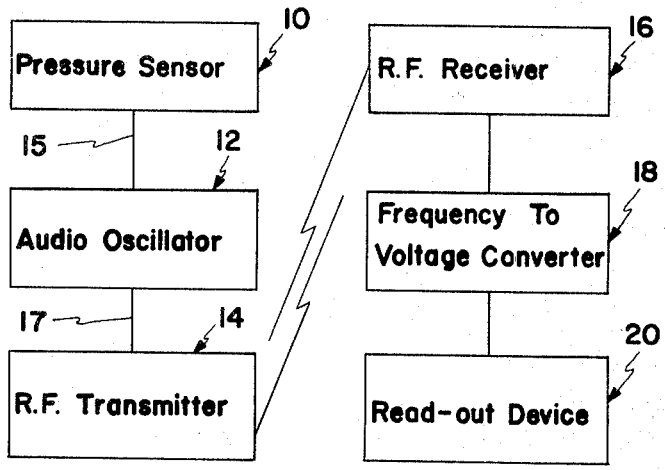
FIG. 2 is a block diagram of transmitting components according to the present invention, which components are implanted within the living test subject.
FIG. 3 is a block diagram of receiving components located remote from the living test subject.

Specific reference is now made to the drawings wherein like numerals illustrate like parts throughout, the Figures illustrating a presently preferred pressure measuring system, generally designated 8. The system 8 comprises: a pressure sensitive device 10, audio oscillator circuitry 12, a transmitter 14, a receiver 16, a frequency-to-voltage converter 18, and read-out device 20.

The pressure sensor 10 is mounted within the skull 11 of a living human being or animal through a burr hole 22 in the skull. See FIG. 1. We have discovered that by placing the pressure sensor 10 in snug, contiguous relation with the outside surface of the dura 13, significantly improved composite pressure readings can be obtained when compared with readings generated by prior art sensors. Hole 22 is of such diameter that the physical structure of sensor 10 can be readily inserted internal to the calvarium 11 and left there to monitor inner cranial pressure and pressure variations.

The audio oscillator 12, to which the sensor 10 is electrically-connected by cable 15, and the transmitter 14, to which the oscillator 12 is electrically-connected by cable 17, are placed external to the calvarium 11, but underneath the scalp 19. Thus, the sensing and transmitting portion of the system 8 is implanted at the skull of and is transported about by the test subject. Consequently, the test subject is free to move about and is not coupled to and inhibited by physical connectors bridging between transmitting and receiving equipment.

The receiving and processing portion of the system 8 is mounted external to and remote from the test subject, and comprises the receiver 16, the frequency-to-voltage converter 18 and the read-out device 20. As the transmitted radio frequency signal is received by the receiver 16, the audio tone detected from the radio frequency signal containing the pressure information is changed to a voltage by the converter 18 and then used to power a read-out device 20 to report optically or otherwise the composite pressure being exerted on the implanted pressure sensor 10 by the subject.

The Pressure Sensor

The pressure sensor 10 comprises a sensitive transistor PQ24 (FIG. 4) which is highly sensitive to pressure variations. More specifically, changes in pressure imposed on transistor PQ24 produce corresponding changes in the collector-to-emitter resistance of transistor PQ24. It is presently preferred that transistor PQ24 comprise a Stolab Pitran Model PT2 transistor. Transistor PQ24 responds to variations in pressure by varying the parameters of the collector and emitter thereof. Thus, the resistance of transistor PQ24 will vary in relation to the pressure conditions being imposed on the transistor. It is a necessary characteristic of transistor PQ24 that the reactance be substantially constant independent of changes in the pressure conditions so that a linear relationship is caused to exist between the anatomical pressure applied to transistor PQ24 and the electrical responses eminating from the transistor.

The Oscillator

Figure 4:
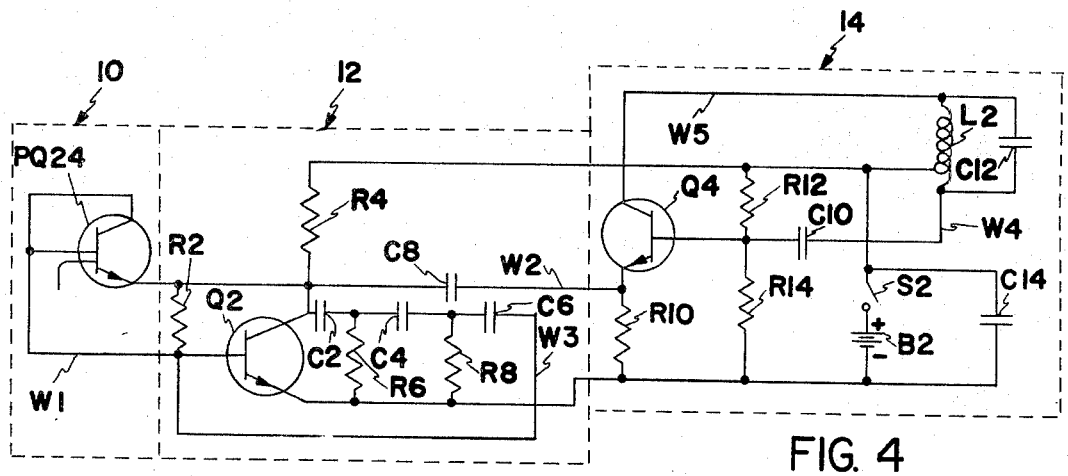
FIG. 4 is a schematic circuit diagram of one presently preferred set of transmitting components.

The oscillator 12 is shown in detail in FIG. 4. The oscillator 12 produces an oscillation in the audio frequency range that is frequency variable and dependent upon the state of pressure sensing transistor PQ24. A common emitter-amplifier, partially formed by transistor Q2, bias resistor R2 and load resistor R4, is coupled to the base and the collector of transistor PQ24 by wire W1 and to a phase shift network formed by capacitors C2, C4 and C6 and resistors R6 and R8. The output of the phase shift network occurs at wire W3 and is fed back through wires W3 and W1 to the base of transistor Q2. This causes the common emitter-amplifier to act as an oscillator. The output of the oscillator 12 is transferred from the collector of transistor Q2 via capacitor C8 across wire W2 to the radio frequency oscillator of the transmitter 14.

The Radio Frequency Transmitter

The radio frequency oscillator circuit 14 produces a radio frequency signal capable of being modulated by the output of oscillator 12. With continued reference to FIG. 4, the operation of the radio frequency oscillator circuit 14 will be explained. Transistor Q4 is biased by resistors R12 and R14 and provided with a D.C. load by resistor R10. Transistor Q4 is connected to both ends of a tank circuit comprising inductor L2 and capacitor C12. Some of the energy provided to the tank circuit from the collector of transistor Q4 through wire W5 is communicated from one end of the inductor L2 by wire W4 and fed through capacitor C10 to the base of transistor Q4 is such phase so as to cause transistor Q4 and the tank circuit, comprising inductor L2 and capacitor C12, to oscillate in the radio frequency range. Capacitor C14 is used to bypass A.C. signals around the miniature power source B2, which power source is used to supply voltage to circuits 10, 12 and 14, when switch S2 is closed.

The output of circuit 12 is connected by wire W2 between the emitter of transistor Q4 and resistor R10. The output of circuit 12 thus modulates the radio frequency signal produced by circuit 14. As a net result, the telemetry circuitry, comprising circuits 10, 12 and 14, produces a radio frequency signal carrying audio frequency information that is related to the composite pressure being applied to the pressure sensing transistor PQ24.

EXTERNALLY MOUNTED DATA READ-OUT CIRCUITRY

The Receiver

Figure 5:
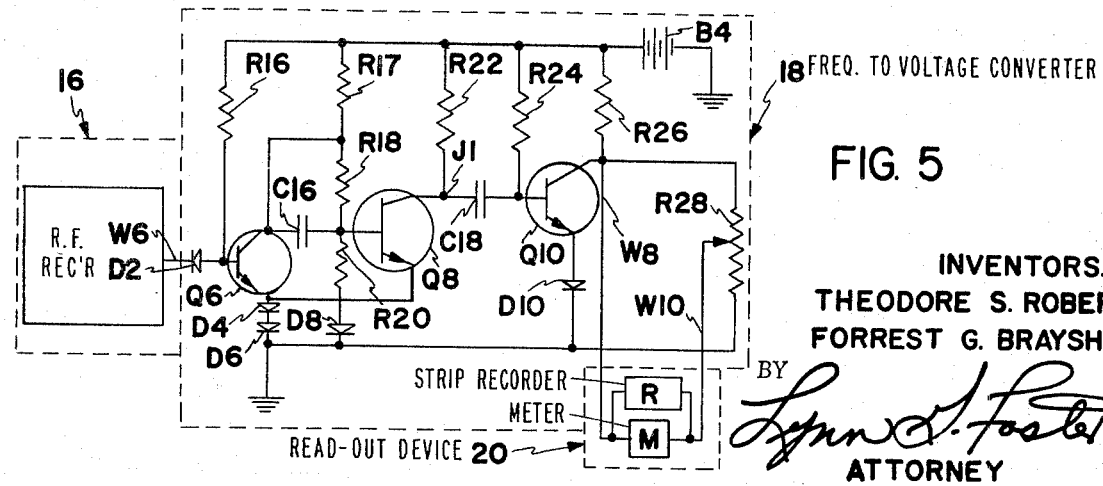
FIG. 5 is a schematic circuit diagram of one presently preferred set of receiving components.

The receiver 16 is conventional and, therefore, is shown diagrammatically in FIG. 5. The output of the receiver 16 is delivered to the input of the frequency-to-voltage converter 18 via wire W6. The receiver 16 receives the signal being transmitted by the telemetry circuitry of FIG. 4 and amplifies and detects the audio portion thereof so that the signal input to converter 18 is compatible with the converter 18.

The Frequency-to-Voltage Converter

The input to the frequency-to-voltage converter is delivered from the receiver 16 via wire W6 to the anode of diode D2. Diode D2 passes any negative signal to the base of transistor Q6. Transistor Q6, being positively biased by resistor R16 is cut off by negative pulses received from the cathode of diode D2. As the base of transistor Q6 is driven negative, the collector is driven positive. This positive signal voltage is transferred to the base of transistor Q8 through capacitor C16. Resistor R17 provides a load for transistor Q6 and diodes D4 and D6 connect the signals from transistors Q6 and Q8 to ground.

Resistors R17, R18 and R20 bias transistor Q8 to the proper quiescent point (Q-point) and diode D8 provides temperature stabilization for transistor Q8. As the base of transistor Q8 is driven positive, the collector is driven negative and current flow is increased through resistor R22.

The signal at the junction J1 of the collector of transistor Q8 and resistor R22 is a negative going pulse. Capacitor C18 is chosen so as to pass the proper amount of this pulsed signal to the base of transistor Q10. The capacity of capacitor C18 is chosen as a function of the frequency of oscillation of circuit 12 and the input parameters of the circuit of transistor Q10.

The base of transistor Q10 is positively biased by resistor R24 and is driven negative by the input signal from capacitor C18. This negative signal on the base of transistor Q10 produces a positive going signal on the collector of transistor Q10 which is connected to load resistor R26. Diode D10 connects the emitter current of transistor Q10 to ground.

The power required for operation of circuit 18 is supplied by battery B4.

The output signal of the collector of transistor Q10 is connected to one end of variable resistor R28 and also to one input of the read-out device 20 via wire W8. Wire W10 connects the slider of variable resistor R28 to a second input of the read-out device 20.

Read-Out Device

The read-out device 20 is conventional and is, therefore, shown diagrammatically in FIG. 5. While any one of several read-out devices could be used, the illustrated system shows in FIG. 5 a strip recorder R and a meter M to which inputs are suplied from circuit 18 via wires W8 and W10.

The invention may be embodied in other specific forms without departing from the spirit or essential characteristics thereof. The present embodiment is, therefore, to be considered in all respects as illustrative and not restrictive, the scope of the invention being indicated by the appended claims rather than by the fore-

What is claimed and desired to be secured by United States Letters Patent is:

1. Apparatus for measuring static and dynamic physiological pressures within a living test subject, comprising:

pressure transducer means adapted to be implanted within the test subject, said transducer means comprising a diode-connected pressure sensitive transistor, the resistance of which, between the emitter and commonly-connected base and collector, varies as a function of the pressure applied thereto;

an audio oscillator adapted to be carried by the test subject and connected for response to said transistor, said oscillator generating a signal the frequency of which varies as the resistance of said transistor;

a radio frequency transmitting means adapted to be worn by the test subject and connected for response to said audio oscillator, said transmitting means propagating an electromagnetic wave which is frequency-modulated at the frequency of said audio oscillator;

radio frequency receiver means adapted to be located remotely from and physically unconnected with the test subject, said receiver means receiving the frequency modulated electromagnetic wave propagated bp said transmitting means and providing a corresponding electric signal;

a freqency-to-voltage converting means connected for response to said receiver means for generating a voltage the amplitude of which varies according to the frequency of the signal applied thereto by said receiver means; and indicating means connected for response to said freuqency-to-voltage converting means for providing, as a function of the voltage applied thereto, an indication of the pressure applied tsaid transistor.

* * * * *